United States Patent [19]

Reid

[11] 4,226,573
[45] Oct. 7, 1980

[54] HYDRAULICALLY-OPERATED MACHINES

[76] Inventor: Alister U. Reid, Kyleakin, Norrels Drive, East Horsley, Surrey, England

[21] Appl. No.: 925,688

[22] Filed: Jul. 18, 1978

Related U.S. Application Data

[63] Continuation of Ser. No. 759,118, Jan. 13, 1977, abandoned.

[30] Foreign Application Priority Data

Jan. 16, 1976 [GB] United Kingdom ............... 1806/76

[51] Int. Cl.² .................... F04B 17/00; F16D 21/02; E21D 9/06
[52] U.S. Cl. .................... 417/329; 417/404; 60/398; 405/146
[58] Field of Search ............ 92/170, 162 R; 417/159, 417/329, 404; 61/24; 156/294; 60/398; 405/146, 150, 99

[56] References Cited

U.S. PATENT DOCUMENTS

| 682,469 | 9/1901 | Irwin | 417/454 |
|---|---|---|---|
| 2,573,993 | 11/1951 | Selzwick | 417/404 |
| 3,030,893 | 4/1962 | Shaffer | 417/404 |
| 3,983,788 | 10/1976 | Andersson et al. | 92/162 R |

FOREIGN PATENT DOCUMENTS

| 176116 | 10/1906 | Fed. Rep. of Germany | 417/329 |
|---|---|---|---|
| 555783 | 3/1923 | France | 417/404 |
| 1108597 | 8/1955 | France | 61/24 |

*Primary Examiner*—Richard E. Gluck
*Attorney, Agent, or Firm*—Haseltine, Lake & Waters

[57] ABSTRACT

A hydraulically-operated machine adapted to receive water at an upper level from a relatively large reservoir and to discharge the water to a lower level, which includes a piston head carried upon a piston rod mounted for vertical movement in guide bushes located above and below the piston head, inlet control valves for allowing water to flow from the upper level alternately to the upper and lower surfaces of the piston head, and outlet control valves for allowing water on the respective other side of the piston head to flow to the lower level.

3 Claims, 6 Drawing Figures

HYDRAULICALLY-OPERATED MACHINES

This is a continuation, of application Ser. No. 759,118 filed Jan. 13, 1977, now abandoned.

This invention relates to hydraulically-operated machines of the type adapted to receive water at an upper level from a relatively large reservoir and to discharge the water to a lower level, energy being extracted in the process by means of a piston head working in a cylinder.

The present invention consists in a hydraulically-operated machine adapted to receive water at an upper level from a relatively large reservoir and to discharge the water to a lower level, which includes a piston head carried upon a piston rod mounted for vertical movement in guide bushes located above and below the piston head, inlet control valves for allowing water to flow from the upper level alternately to the upper and lower surfaces of the piston head, and outlet control valves for allowing water on the respective other side of the piston head to flow to the lower level.

The invention further consists in a machine as set forth in the previous paragraph, which has a cylinder wall liner grouted into position to give a uniform gap of minimum dimension relative to the piston head over the entire stroke of the piston.

The invention still further consists in a machine as set forth in either of the two preceding paragraphs wherein the piston head is hollow and ballasted.

The invention still further consists in a machine as set forth in any of the three preceding paragraphs, wherein the piston rod connects the piston head to a double-acting ram pump supplying fluid at a high pressure to a hydraulic accumulator with variable ballast.

The invention still further consists in a machine as set forth in any of the four preceding paragraphs wherein the inlet and/or outlet control valves are large opening primary water gates arranged to be protected when in their open position by fixed guide vanes which also provide lateral support for the gates, when they are in the closed position, to resist the thrust of the water head.

Figure 4A:
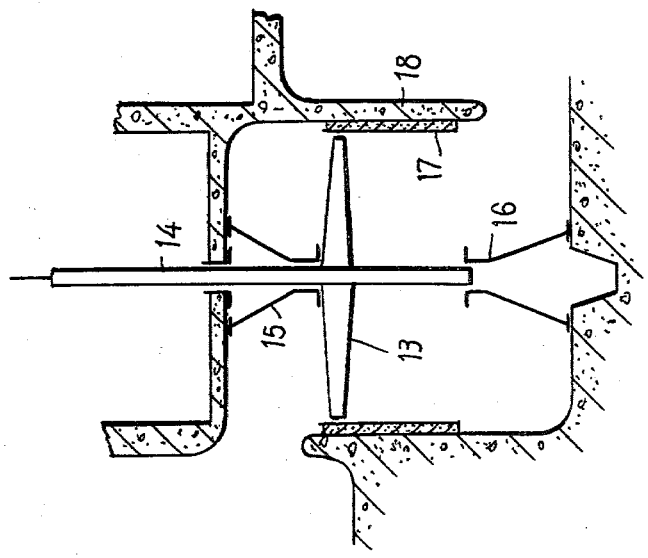
FIG. 4a is a vertical section through one form of the hydraulically-operated machine taken along line 1—1 of FIG. 3 illustrating the flexible liner inserted over the keeper ring and piston head as grouted into position.
Figure 4B:
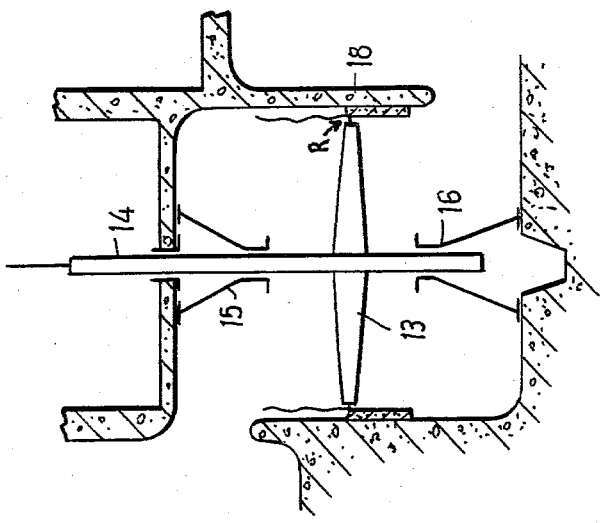
FIG. 4b is another view of FIG. 4a illustrating the raising of the connecting rod, piston head, keeper ring assembly on the axis set by the upper and lower guides.
Figure 4C:
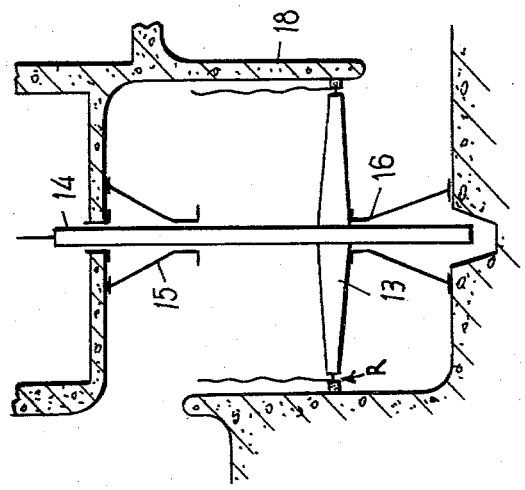
FIG. 4c is another illustration of FIG. 4a in which the keeper ring is removed at the top of the stroke to provide a clearance gap over the piston head for the length of the stroke.

In carrying the invention into effect according to one convenient mode by way of example, the accompanying drawings show a hydraulically-operated machine for deriving energy from water at an upper level 11 as it is directed to a lower level 12. The machine includes a piston head 13 and rod 14 assembly which is constrained to move vertically through upper 15 and lower 16 guide bushes, this arrangement allowing a thin-walled cylinder liner 17 to be set accurately in position in the boxout of a cylinder block 18. In this way, the liner 17 can be grouted into position while the piston head 13 is raised up through the stroke length so ensuring a uniform clearance gap of say $\frac{1}{4}''$ relative to the piston head 13 over the entire stroke. FIGS. 4a through 4c illustrate the basis by which the liner is inserted in a cylinder with a diameter greater than 20 feet. As shown in FIG. 4a a thin flexible liner is inserted over the keeper ring R and piston head 13 and then grouted into position. Thereafter as indicated in FIG. 4b, grouting continues while the connecting rod 14, piston head 13, and keeper ring R all are raised on the axis set by the upper and lower guide bushes. Lastly, the keeper ring R is removed at the top of the stroke to provide a fine clearance gap of less than one quarter inch over the piston head 13 for the entire length of the stroke. This last arrangement is illustrated in FIG. 4c. As a result, the construction is made possible of machines of large diameter, say in excess of 20 feet. The piston rod 14 is keyed through a bush in order to prevent rotation of the piston head about the axis of the piston rod so maintaining the clearance gap. Water will pass through the gap, in the direction of the travel of the piston head and clear away grit etc from the gap. As an alternative, the piston, liner and wall of a cavity may be of square section.

Figure 1:
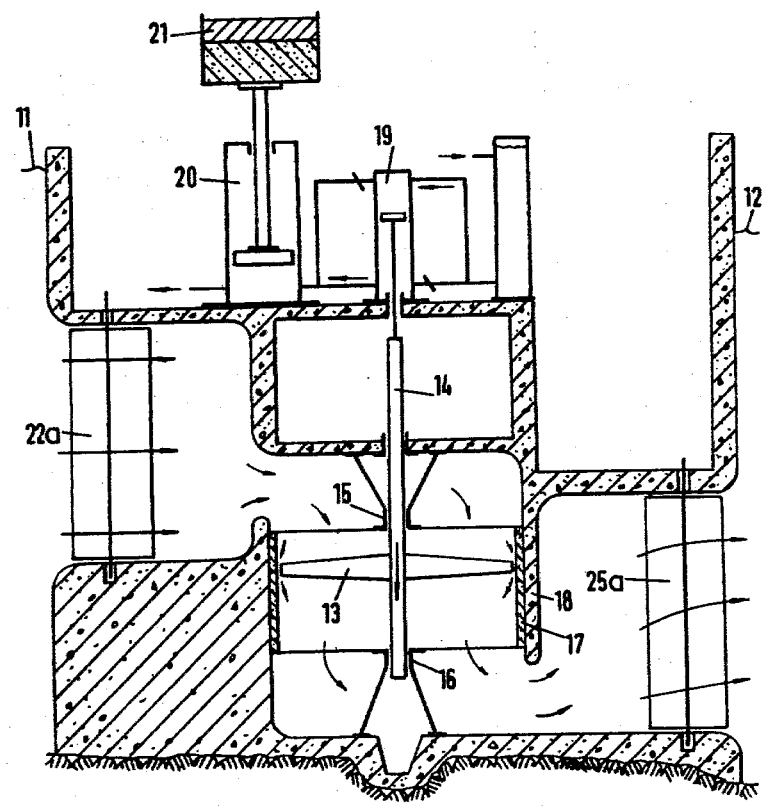
FIG. 1 is a vertical section through one form of hydraulically-operated machine according to the present invention, taken on line 1—1 of FIG. 3.
Figure 2:
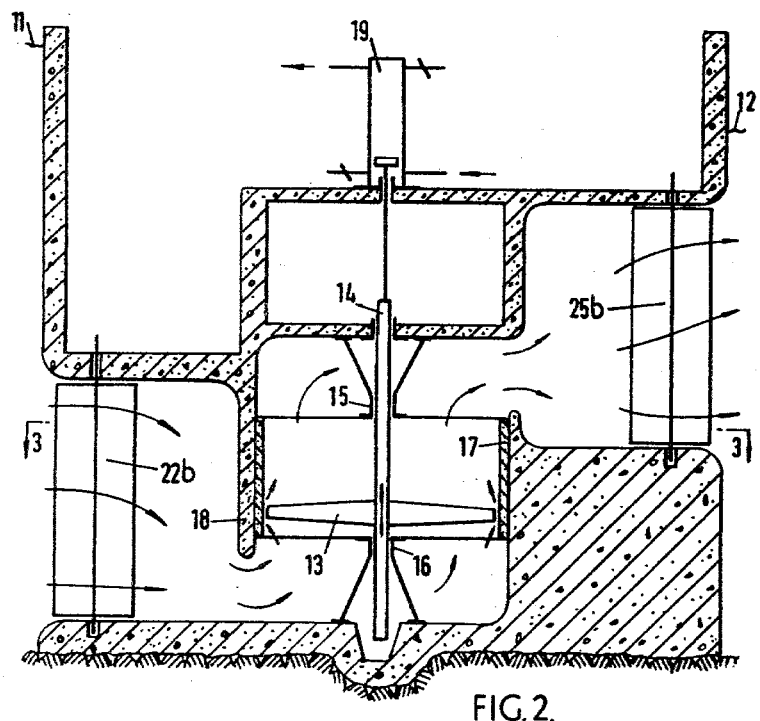
FIG. 2 is a vertical section taken on line 2—2 of FIG. 3.
Figure 3:
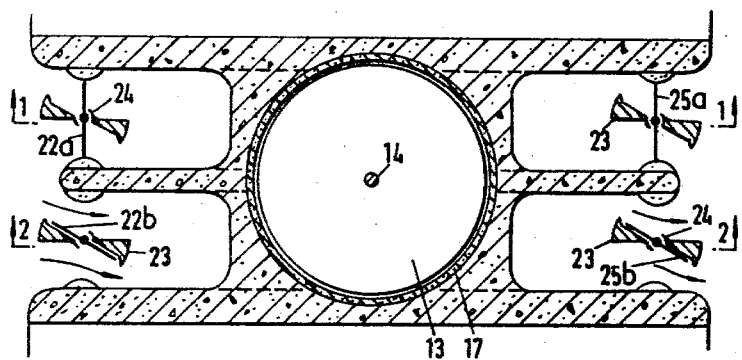
FIG. 3 is a horizontal section taken on line 3—3 of FIG. 2.

In one half cycle of operation as shown in FIG. 1, inlet gates 22a are opened to allow water to flow from the upper level to the upper surface of the piston head 13, and outlet gates 25a are opened to allow water on the other side (i.e. lower side) of the piston head 13 to flow to the lower level. When the piston head 13 has descended to its lowermost position, gates 22a and 25a are closed and inlet gates 22b and outlet gates 25b opened to allow upper level water to flow to the lower surface of the piston head 13 and water to flow from the upper side of the piston head 13 to the lower level. This second half cycle of operation is allowed to continue until the piston head 13 has reached its uppermost position whereupon the first half cycle is again repeated. This vertical reciprocation of the piston head B is used to operate a double-acting ram pump 19 connected to the piston rod 14.

The weight of the piston head 13 and rod 14 assembly would adversely affect the working of the machine because the force induced in the shaft by the excess pressure on the piston head produced by the difference in liquid levels in the upper and lower reservoirs would be increased by the weight of the assembly on the down stroke but the induced force would be decreased by the same amount on the up stroke. However, the induced shaft force for the up and down stroke can be brought into balance using a hollow piston head to provide buoyancy with ballast to ensure equal output pressure to the fluid from both strokes of a double-acting ram pump 19 supplying fluid at a high pressure to a hydraulic accumulator 20.

The output pressure from the ram pump will change over a period of time with any change in the head difference in liquid levels of the upper and lower reservoirs and therefore, it is necessary to provide for variable ballast 21 on the hydraulic accumulator in order to control the working of the prime mover over the range of operating heads.

The rate of discharge of the primary water is dependent on the area of the gate openings which could be say 20 ft. high. Fixed guide vanes 23 would be required to protect the gates 22 and gates 25 in the open position when water would be passing at a velocity of about 10 ft/sec. Bearing blocks 24 would be mounted on the fixed vanes at intervals as support for the spindle when the gates are in the closed position in order to resist the thrust produced by the head of water on the gates.

Provision would be made for arresting the piston assembly at the end of the up and the down stroke with controls to open and close the gates and valves in the operation of the prime mover.

The operation of the machine is easily adjusted to accommodate the reverse flow of the water through the machine when the water level 12 is higher than water level 11.

I claim:

1. A hydraulically-operated low head machine of large diameter, in excess of 20 feet, adapted to receive water at an upper level from a relatively large reservoir and to discharge the water to a lower level, which includes: a hollow ballasted piston head carried upon a piston rod for movement in a concrete cylinder structure, said piston rod being mounted for vertical movement in guide bushes located above and below the piston head, said cylinder structure being formed of a wall having a thin flexible liner on a bed of grouting between said liner and a wall of a cavity in said concrete structure, said liner being positioned in said cylinder wall through relative movement in one stroke of said piston head to provide a uniform gap of minimum dimension relative to the piston head over its entire stroke, control valve means; said control valve means being disposed in control valve passage means; and said control valve passage means comprising, concrete inlet control valve passage means and gates for allowing water to flow from the upper level alternately to the upper and lower surfaces of the piston head, and concrete outlet control valve passage means for allowing water on the respective other side of the piston head to flow to the lower level.

2. A machine as claimed in claim 1, wherein the piston rod being adapted to connect the piston head to a double-acting ram pump supplying fluid at controlled pressure through a hydraulic accumulator with variable ballast.

3. A machine as claimed in claim 1, having two concrete inlet and outlet control valve means disposed in said control valve passage means, comprising: said gates defined as large opening primary water gates arranged to be protected when in their open position; fixed guide vanes providing lateral support for said gates, when in the closed position to resist the thrust of water head, each of said gates being located in said passage of said concrete structure, where an area of the opening in said passage is substantially equal to the area of said gate.

* * * * *